(12) United States Patent
Shaffer et al.

(10) Patent No.: US 9,836,721 B2
(45) Date of Patent: Dec. 5, 2017

(54) DEFINING FUTURE PLANS IN CONNECTION WITH OBJECTS IN A SOCIAL NETWORKING SYSTEM

(75) Inventors: Justin Alexander Shaffer, Menlo Park, CA (US); Ross David Bayer, Mountain View, CA (US); Thomas Andrew Watson, San Francisco, CA (US); Srinivas P. Narayanan, San Francisco, CA (US); Devin James Naquin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/300,979

(22) Filed: Nov. 21, 2011

(65) Prior Publication Data

US 2013/0132476 A1    May 23, 2013

(51) Int. Cl.
  *G06F 15/16*    (2006.01)
  *G06Q 10/10*    (2012.01)
  *G06Q 50/00*    (2012.01)

(52) U.S. Cl.
  CPC ............ *G06Q 10/10* (2013.01); *G06Q 50/01* (2013.01)

(58) Field of Classification Search
  CPC .............................. H04L 12/588; H04L 51/32
  USPC ........................................................ 709/204
  See application file for complete search history.

(56) References Cited

U.S. PATENT DOCUMENTS

| | | | |
|---|---|---|---|
| 5,937,413 A | 8/1999 | Hyun et al. | |
| 6,029,141 A | 2/2000 | Bezos et al. | |
| 6,377,965 B1 | 4/2002 | Hachamovitch et al. | |
| 7,013,292 B1 | 3/2006 | Hsu et al. | |
| 7,249,123 B2 | 7/2007 | Elder et al. | |
| 7,269,590 B2 | 9/2007 | Hull et al. | |
| 7,757,176 B2 | 7/2010 | Vakil et al. | |
| 7,801,956 B1 | 9/2010 | Cumberbatch et al. | |
| 8,700,540 B1 * | 4/2014 | Zambrano ............. | G06Q 50/01 705/319 |
| 2001/0037721 A1 | 11/2001 | Hasegawa et al. | |
| 2002/0059201 A1 | 5/2002 | Work | |
| 2003/0145093 A1 | 7/2003 | Oren et al. | |
| 2003/0222918 A1 | 12/2003 | Coulthard | |
| 2003/0225632 A1 | 12/2003 | Tong et al. | |
| 2004/0024846 A1 | 2/2004 | Randall et al. | |
| 2004/0088177 A1 | 5/2004 | Travis et al. | |
| 2004/0148275 A1 | 7/2004 | Achlioptas | |
| 2004/0215737 A1 | 10/2004 | Della Pasqua | |
| 2005/0020243 A1 * | 1/2005 | Benco .................... | H04W 8/18 455/406 |
| 2005/0021750 A1 | 1/2005 | Abrams | |

(Continued)

OTHER PUBLICATIONS

United States Office Action, U.S. Appl. No. 13/341,985, dated Mar. 1, 2013, seventeen pages.

(Continued)

*Primary Examiner* — Sm Rahman
(74) *Attorney, Agent, or Firm* — Fenwick & West LLP (57) ABSTRACT

A social networking system that provides a system allowing users of the social networking system to define future plans, whereby users of the social networking system who view the plan are permitted to add themselves to the plan independent of whether they were explicitly specified as attendees of the plan. The social networking system is capable of auto-filling some missing plan details through inference. The social networking system is also capable of merging similar plans together.

20 Claims, 6 Drawing Sheets

(56) References Cited

U.S. PATENT DOCUMENTS

| | | | |
|---|---|---|---|
| 2005/0108030 A1* | 5/2005 | Kim | G06Q 10/10 705/317 |
| 2005/0114759 A1 | 5/2005 | Williams et al. | |
| 2005/0154639 A1 | 7/2005 | Zetmeir | |
| 2005/0159970 A1 | 7/2005 | Buyukkokten et al. | |
| 2005/0171799 A1 | 8/2005 | Hull et al. | |
| 2005/0171955 A1 | 8/2005 | Hull et al. | |
| 2005/0177385 A1 | 8/2005 | Hull et al. | |
| 2005/0197846 A1 | 9/2005 | Pezaris et al. | |
| 2005/0198020 A1 | 9/2005 | Garland et al. | |
| 2005/0198031 A1 | 9/2005 | Pezaris et al. | |
| 2005/0198305 A1 | 9/2005 | Pezaris et al. | |
| 2005/0203807 A1 | 9/2005 | Bezos et al. | |
| 2005/0216300 A1 | 9/2005 | Appelman et al. | |
| 2005/0216550 A1 | 9/2005 | Paseman et al. | |
| 2005/0227216 A1 | 10/2005 | Gupta | |
| 2005/0235062 A1 | 10/2005 | Lunt et al. | |
| 2005/0256756 A1 | 11/2005 | Lam et al. | |
| 2006/0041460 A1 | 2/2006 | Aaron | |
| 2006/0041543 A1 | 2/2006 | Achlioptas | |
| 2006/0042483 A1 | 3/2006 | Work et al. | |
| 2006/0048059 A1 | 3/2006 | Etkin | |
| 2006/0052091 A1 | 3/2006 | Onyon et al. | |
| 2006/0080613 A1 | 4/2006 | Savant | |
| 2006/0085419 A1 | 4/2006 | Rosen | |
| 2006/0136419 A1 | 6/2006 | Brydon et al. | |
| 2006/0143183 A1 | 6/2006 | Goldberg et al. | |
| 2006/0161599 A1 | 7/2006 | Rosen | |
| 2006/0184617 A1 | 8/2006 | Nicholas et al. | |
| 2006/0190281 A1 | 8/2006 | Kott et al. | |
| 2006/0194186 A1 | 8/2006 | Nanda | |
| 2006/0200374 A1* | 9/2006 | Nelken | 705/9 |
| 2006/0218225 A1 | 9/2006 | Hee Voon et al. | |
| 2006/0229063 A1 | 10/2006 | Koch | |
| 2006/0230061 A1 | 10/2006 | Sample et al. | |
| 2006/0247940 A1 | 11/2006 | Zhu et al. | |
| 2006/0248573 A1 | 11/2006 | Pannu et al. | |
| 2006/0256008 A1 | 11/2006 | Rosenburg | |
| 2006/0265227 A1 | 11/2006 | Sadamura et al. | |
| 2006/0293976 A1 | 12/2006 | Nam | |
| 2007/0064626 A1 | 3/2007 | Evans | |
| 2007/0150513 A1 | 6/2007 | Vanden Heuvel et al. | |
| 2007/0174389 A1 | 7/2007 | Armstrong et al. | |
| 2007/0208916 A1 | 9/2007 | Tomita | |
| 2007/0233736 A1 | 10/2007 | Xiong et al. | |
| 2007/0282987 A1 | 12/2007 | Fischer et al. | |
| 2008/0005076 A1 | 1/2008 | Payne et al. | |
| 2008/0010258 A1 | 1/2008 | Sureka | |
| 2008/0010343 A1 | 1/2008 | Escaffi et al. | |
| 2008/0033776 A1 | 2/2008 | Marchese | |
| 2008/0040428 A1 | 2/2008 | Wei et al. | |
| 2008/0070697 A1 | 3/2008 | Robinson et al. | |
| 2008/0077888 A1 | 3/2008 | Miksovsky | |
| 2008/0086458 A1 | 4/2008 | Robinson et al. | |
| 2008/0098313 A1 | 4/2008 | Pollack | |
| 2008/0103907 A1 | 5/2008 | Maislos et al. | |
| 2008/0120396 A1 | 5/2008 | Jayaram et al. | |
| 2008/0126476 A1 | 5/2008 | Nicholas et al. | |
| 2008/0147482 A1 | 6/2008 | Messing et al. | |
| 2008/0162510 A1 | 7/2008 | Baio et al. | |
| 2008/0300937 A1 | 12/2008 | Allen et al. | |
| 2009/0215469 A1* | 8/2009 | Fisher | H04L 12/588 455/456.3 |
| 2011/0119598 A1* | 5/2011 | Traylor | G06Q 10/10 715/753 |
| 2011/0161130 A1* | 6/2011 | Whalin et al. | 705/7.18 |
| 2011/0251911 A1* | 10/2011 | Junger | G06Q 10/087 705/23 |
| 2012/0124147 A1* | 5/2012 | Hamlin | H04L 51/36 709/206 |
| 2013/0103758 A1* | 4/2013 | Alison | G06Q 50/01 709/204 |

OTHER PUBLICATIONS

Chipin, "Chipin: The easy way to collect money," [online], Dec. 15, 2006, <http://web.archive.org/web/20061215090739/www.chipin.com/overview>.

Coombs, T., et al., "Google Power Tools Bible," Mar. 12, 2007, Chapter 26, pp. 369-382, Wiley Publishing, Inc.

Ferra, L., et al., "2005 Standard for the Annotation of Temporal Expressions," TIDES, Apr. 2005, 77 pages.

Flores, F., et al., "Computer systems and the design of organizational interaction," in ACM Transactions on Information Systems (TOIS), vol. 6, Issue 2, Apr. 1988.

Ito, K., "Email Event Extraction and Interpretation," CS224N Final Project, Jun. 5, 2003, pp. 1-13.

"Microsoft Outlook 2003 Basic Guide," Microsoft, 2003, 32 pages.

Parzek, E., "Social Networking to ChipIn to a Good Cause," [online], Business Design Studio, Jun. 29, 2006, <http://www.businessdesignstudio.com/resources/blogger/2006/06social-net-working-tochipin-to-good.html>.

United States Patent and Trademark Office, Non-final Office Action, U.S. Appl. No. 13/341,985, dated Jun. 27, 2012, 9 pages.

United States Patent and Trademark Office, Non-final Office Action, U.S. Appl. No. 12/080,808, dated May 23, 2012, 13 pages.

United States Office Action, U.S. Appl. No. 12/080,808, dated Dec. 19, 2013, seventeen pages.

United States Office Action, U.S. Appl. No. 13/341,985, dated Jan. 7, 2015, seventeen pages.

United States Office Action, U.S. Appl. No. 13/804,601, dated Jun. 4, 2015, 8 pages.

United States Office Action, U.S. Appl. No. 13/341,985, dated Nov. 19, 2015, nineteen pages.

United States Office Action, U.S. Appl. No. 13/341,985, dated May 19, 2016, nineteen pages.

* cited by examiner

DEFINING FUTURE PLANS IN CONNECTION WITH OBJECTS IN A SOCIAL NETWORKING SYSTEM

BACKGROUND

This invention relates generally to social networking, and in particular to providing and communicating planned activities of a user of a social networking system.

Social networking systems have become prevalent in recent years because they provide a useful environment in which users can connect to and communicate with other users. A variety of different types of social networking systems exist that provide mechanisms allowing users to interact within their social networks. Some social networking systems also include tools that allow users to calendar events to coordinate activities with other users. In addition to providing event scheduling for the users involved, in the social networking system context these calendaring tools also serve a socializing function of informing other users of the activities of their contacts.

However, existing calendaring functions of social networking systems have drawbacks. Calendaring tools as implemented in current social networking systems are generally based on their traditional equivalents. Thus, they include means of specifying all manner of details of events. This level of detail is useful if the event to be calendared is of a large scale, well defined attendees or invitees, and has fixed details that all potential attendees need to know well in advance. However, these tools are inflexible for smaller scale events where plans may be changing on the fly, or where the details are settled on last minute. Particularly, it is common for a calendaring tool to include an RSVP function where the host of the event seeks invitees response as to whether they will be attending the event. In cases where the events are changing on the fly, RSVPs may become inaccurate if plans change. Further, in the social networking context, users may want to be informed that an event is occurring but not have to deal with the social burden of responding to an event invitation.

SUMMARY

A social networking system that provides a system allowing users of the social networking system to define future plans, whereby users of the social networking system who view the plan are permitted to add themselves to the plan independent of whether they were explicitly specified as attendees of the plan. When created, plans are communicated to users of the social networking system, including both attendees of the plan as well as users not directly affiliated with the plan but who are connected to the attendees of the plan through a social graph of the social networking system. As users of the social networking system who saw the plan but were not initially affiliated with the plan add themselves to the plan, the plan is communicated through their social graphs to other users who had not initially seen the plan. Thus, plans have the ability to spread virally through the users of the social networking system.

The social networking system is capable of auto-filling some missing plan details. A plan may include one or more of an identification of a user who will perform the activity, a future time during which the activity will be performed, a location where the activity will be performed, and one or more other users with whom the author intends to perform the activity. If one or more these pieces of information is left out, it may be inferred from the details that were included in the plan details and the social graphs of those users affiliated with the plan.

The social networking system is also capable of merging similar plans together. The social networking system may compare the details of plans and the social graphs of the users affiliated with those plans to find plans matching plans. The social networking system presents matching plans to the author of a plan, so that the author may choose which plan to merge with. When plans are merged, details missing from either plan are filled in from information specified in the other plan. Further, the users affiliated with each plan are merged into a single group of attendees of the now-merged plan.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Social networking systems commonly provide mechanisms allowing users to interact with objects and other users both within and external to the context of the social networking system. A social networking system user may be an individual or any other entity, such as a business or other non-person entity. The social networking system may utilize a web-based interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application.

Social networking system information that is tracked and maintained by a social networking system may be stored as a social graph, which includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects.

A social networking system object may be a social networking system user, non-person entity, content item, group, social networking system page, location, application, concept or other social networking system object, such as a movie, a band, or a book. Content items may be anything that a social networking system user or other object may create, upload, edit or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Each social networking system object may be represented by a distinct social networking system node in a social graph.

Online social networking systems allow users to associate themselves and establish connections with other users of the social networking system. When two users establish a connection, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. Finally, being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users. If a first user comments on a second user's shared HTTP link, an edge may connect the first user's node and the shared link's node, or an edge may connect the first user's node and the second user's node, or both.

Users of social networking systems may also interact with non-user objects within the social networking system, for instance, objects displayed on or contained within a social networking system page. This interaction may take a variety of forms, such as communicating with or about or commenting on an object, clicking a button or link associated with approval (such as a "like" button), sharing a social networking system object with other users, downloading or merely viewing a social networking system object, uploading an object, linking to an object, tagging an object, editing an object, playing an object, accessing an object, or by any other suitable means for interaction. Further, a user may interact with a group or fan page object by forming or joining groups, or becoming a fan of a fan page. Interactions with non-user objects may also be represented by edges connecting a user's node and an object node in a social graph. Finally, a social networking system user may interact with social networking system objects outside of the context of the social networking system's pages that are connected to or associated with the social networking system. For instance, an article on a news web site might have a "like" button that users of the social networking system can click on to express approval of the article. Likewise, a company's website may provide the ability to join a social networking system group dedicated to the company directly from the company's website. In such instances, an edge may connect a user and a social networking system node representing the externally-hosted news article or the external company website.

A social networking system may allow a user to establish a variety of connections with another user. For example, users may establish various personal relationships with another user in a social networking system, such as a friendship, a romantic relationship (such as dating, engagement, or marriage), or a familial relationship (such as parent/child, grandparent/grandchild, aunt/uncle/niece/nephew, or cousin). In addition, users may establish non-personal relationships, such as employee/employer/co-worker or student/teacher/classmate. A social networking system may also allow a user to establish details of relationships, such as anniversaries or other relationship milestones. Each type of established connection may be represented by an edge in the social graph, and more than one edge may connect two users with an established relationship. For example, if two users are cousins and co-workers, a first edge may connect the users for establishing a connection in the social networking system, a second edge may connect the users for indicating that they are cousins, and a third edge may connect the users for indicating that they are co-workers.

A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user. The social networking system may store these communications, and each communication may be represented by a node in the social graph. Communicating users may be connected to each other by an edge in the social graph, or they may be connected by an edge to a communication node.

A social networking system may allow a user to upload pictures. Each picture may also be represented by a node in the social graph, and an edge connects the user who uploaded the picture to the picture. The social networking system may allow users to tag pictures by associating a picture or a location within the picture with the identity of a social networking system user. For example, a first user may recognize that an uploaded picture is an image of several friends, and may associate the identities of each friend with the location within the image of each friend's face. In addition, the social networking system may allow users to comment on, link to, communicate about or edit the picture. In the social graph, an edge may connect users who have viewed, tagged, been tagged in, commented on, linked to, communicated about, or edited the picture to the node representing the picture. Likewise, an edge may connect users who have performed similar interactions with or been tagged in a video to the node representing the video.

A social networking system may allow a user to recommend a social networking system object to another user. For example, a first user may recommend that a second user view a content item, establish a connection with another user, or a join group through the social networking system interface. An edge may connect the first user and the second user, and may connect the first user and the second user to the recommended object. A second edge may connect the social networking system object to the second user if the second user accepts the recommendation.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by an object in the social graph. Further, an edge may connect a user with any object representing information in the user's profile page. For example, if in a profile page a user indicates attendance at "the University of Idaho", lists "Anchorman" as a favorite movie, and lists "Post Falls, Idaho" as a hometown, the user may be connected by an edge to objects representing the University of Idaho, Anchorman, and Post Falls, Idaho.

A social networking system may include a newsfeed which provides an organized flow of information to a user of a social networking system. The information contained in the newsfeed may include information related to the activities of other users in the social networking system who are connected with the user. For example, the newsfeed may include conversations between two mutually connected users on the social networking system. The newsfeed may incorporate material external to the social networking system, for example links to web pages, videos, pictures, or audio files which other users of the social networking system have indicated as being interesting. The newsfeed may be tailored to the specific interests of the user, incorporating data related to their pattern of use of the social networking system. The newsfeed may be tailored based on the strength of the connection between items posted between two users of the social networking system. Items and activities presented in the newsfeed may be presented chronologically based on the order of their appearance in the social networking system, or ranked according to the predicted importance of the activities to the user.

Defining Future Plans in Connection with Objects in a Social Networking System

Figure 1:
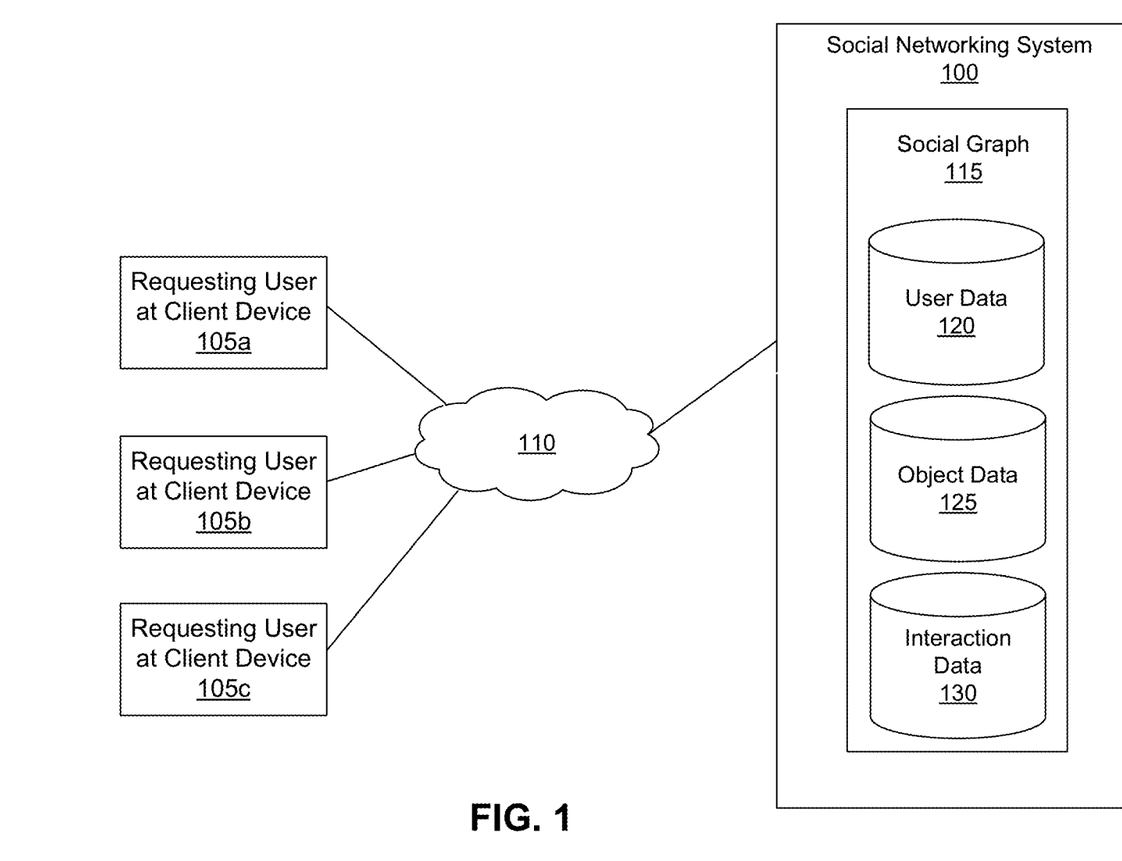
FIG. 1 is a diagram of a social networking system allowing users to define future plans, according to one embodiment.

FIG. 1 is a diagram of a social networking system allowing users to define future planned activities. Users access the social networking system 100 over a network 110 through client devices 105. Information that is tracked and maintained by a social networking system 100 may be stored as a social graph 115. In one embodiment, the information that is stored in the social graph 115 may be broken down into three categories, user data 120 associated with users of the social networking system, object data 125 associated with objects, and interaction data 130 associated with information related to interactions and connections between social graph nodes.

The social networking system 100 allows users to define plans for future activity in conjunction with objects or users stored in the social networking system. For convenience, the term "plans" refers to an indication of a future activity articulated by an author who is a user of a social networking system 100. A plan may include one or more of an identification of a user who will perform the activity, a future time during which the activity will be performed, a location where the activity will be performed, and one or more other users with whom the author intends to perform the activity. Once the plan is authored, it is stored by the social networking system 100. Plans are stored in the interaction data 130 as edges between nodes in the social network graph 115. Thus, rather than being objects themselves, plans pull together disparate objects in the social graph 115 by forming edges between the objects. In one embodiment, a plan for a future activity comprises one or more edges connecting two or more objects stored in the object data 125 or user data 120 of the social graph 115 of the social networking system 100.

Figure 2:
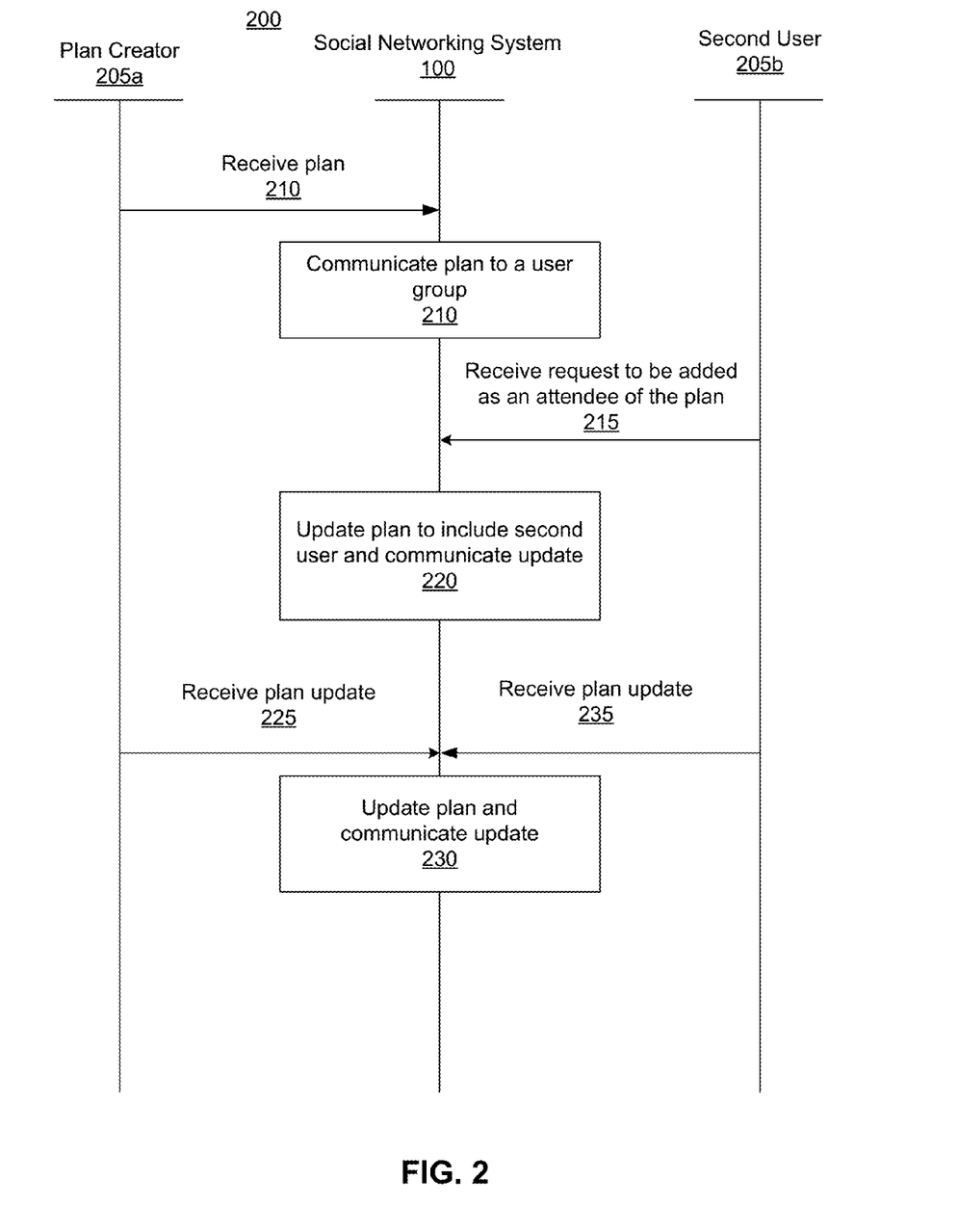
FIG. 2 is an interaction diagram of one embodiment of a process for defining future planned activities in a social networking system, according to one embodiment.

FIG. 2 is an interaction diagram of one embodiment of a process for defining future plans in a social networking system. FIG. 2 illustrates how a social networking system 100 incorporates input from a plan creator 205a and a second user 205b to create and a plan. The social networking system 100 is configured to receive 210 a plan authored by a plan creator 205a.

Plans may be lightweight in that they require very little information to be initially set up by a user of the social networking system 100. Plans may include, but are not limited to, information about the time of the future activity, an initial set of attendees (or participants) for the activity, the activity to be performed or engaged in, where the activity will take place, a security setting regarding who will receive information about the plan, and/or an object stored in the social networking system that will be associated with the plan. In one embodiment, as long as at least one of the above items is specified, the plan may be created. Plans may include more than this minimum amount of information. For example, a plan may indicate that the author and five specifically mentioned friends are going to meet at a high school in San Mateo at 11 a.m. on Saturday morning to assist in a library book sale.

There are many examples of plans that may be created using this system. A plan may be simply for the author of the plan to hang out with another user. The plan may be for the author to eat at a certain restaurant, or go to a concert, to go bowling, or to hang out. Even though the plan may have multiple attendees, the activity can be engaged in by the attendees at different physical locations. For example, the author may indicate that at 8 p.m. that the plan is to watch the "Mad Men" series premiere on television, where each attendee watches at their own home. In one embodiment, if the plan merely specifies an initial set of attendees, the author of the plan specifies at least two attendees including the author who will participate in the plan. In one embodiment, if the plan does not indicate an initial set of attendees, the initial set of attendees is automatically defined to include at least the author of the plan.

A plan author may also create a plan that is an open invitation to other users of the social networking system to create a plan which the author may join. In one embodiment, the author's plan may indicate that they have no other activities scheduled for a certain block of time, or that they have no other activities scheduled for the indefinite future. In one example, a plan author may create a plan to "do nothing." In one embodiment, the author's plan may specify when and/or where the author will be free. For example, if the author is traveling to a different city on business, they may enter a plan indicating when they are free in that city before they leave to go home. In one embodiment, the plan may indicate the author's lack of scheduled activities with respect to time, location, other users, or with respect to a provided topic, activity, or thing. For example, a user may author a plan indicating that they are free on Saturday even to do anything music in San Francisco with their friends.

Plans may also be flexible in that they are easily modified by the author or attendees who will participate in or carry out the plan. Plans may be modified up until the point when the planned activity is to occur, or while the activity is occurring. Control over who may modify the plan once it has been created may vary at the discretion of the author of the plan. The author of the plan may choose to retain exclusive control over the contents of the plan. Alternatively, the author may choose to allow attendees of the plan to change the plan's details. In one embodiment, attendees may be allowed to make tentative changes to the plan which are then confirmed or rejected by the plan's author. In one embodiment, the plan may be edited by a user who receives communications regarding the plan.

In one embodiment, the author of a plan is provided with a privacy setting regarding which users of the social networking system will receive information regarding the plan. The author is presented with a choice of which users in the social networking system will receive communications regarding the plan. In one embodiment, the author is presented with one or more of the following privacy settings: all users in the social networking system, just those users who are connected as friends through their social graph, those users who are within one of their previously specified networks or affiliated groups, just those users who are connected as friends or friends of those friends through their social graph. In one embodiment, the author may also individually tailor the list of users or groups who will receive communications regarding the plan.

Once the plan has been created, the plan is stored in the interaction data 130 of the social graph 115 of the social networking system. The plan is then communicated 210 to a group of users. The plan may be communicated via any of a number of communication channels within and outside the social networking system, and may be communicated differently to different groups of the social networking system. In one embodiment, the communication of the plan 210 includes publishing the plan information to the newsfeeds of a group of users of the social networking system. This user group may include attendees who are listed as part of the plan, and it may also include users who are not part of the plan. In one embodiment, in addition to attendees the user group includes all users who are connected to the author of the plan through the author's social graph 115. In one embodiment, in addition to attendees the user group includes all users who are connected to the attendees of the plan through the attendee's social graphs 115. In one embodiment, the user group receiving communication 210 of the plan is determined based on the privacy setting chosen by the author.

The plan information may also be pushed as a notification to all users who are listed as attendees of the plan. The notification is pushed to the attendees from the social networking system 100 through the network 110 to client devices 105. For example, if an attendee of the plan is connected to the social networking system using a mobile device type client device 105 (e.g., a smart phone or tablet computer), then the notification is pushed to the mobile device. The published notification may also including pushing the plan information to the profile pages of the attendees of the plan. The plan may also be pushed to the profile pages of any objects associated with the plan.

Users of the social networking system who receive the newsfeed publication of the plan and who are not yet attendees may want to attend the plan. The social networking system 100 receives 215 requests by users 205b to be added as attendees of the plan. In one embodiment, if the author retains sole control over the plan, a second user 205b asking to be added to the plan will only be added with the approval of the author. In other embodiments, the second user 205b is added automatically or after approval by the attendees of the plan.

The social networking system 100 updates 220 the plan to include the second user 205b. The social networking system 100 communicates 220 the updated plan information to the attendees of the plan as well as the user group designated to receive communications regarding the plan. Communication of plan updates 220 may occur through the same mechanisms under which the plan was originally communicated 210 (e.g., push notifications to mobile devices or profile updates of objects stored in the social networking system, and/or newsfeed publications to the attendees and possibly the user group). In one embodiment, once a new user has been added as an attendee of the plan, the updated plan is communicated 220 to those users of the social networking system who are connected to the newly added user through that users social graph 115.

Plans may also be updated after they have been created. In embodiments where the author or social networking system allows only the author to modify the plan, the social networking system 100 is configured to receive 225 plan updates from the author. In embodiments, where the author or the social networking system have granted others the authority to update the plan, for example the attendees, the social networking system 100 is configured to receive 235 plan updates from users other than the plan creator 205a. Updates to the plan may comprise any item of information that may be included when the plan is originally created, including, for example, information about the time of the future activity, an initial set of attendees (or participants) for the activity, the activity to be performed or engaged in, where the activity will take place, a security setting regarding who will receive information about the plan, and/or an object stored in the social networking system that will be associated with the plan. Similarly to the case of adding a user, the social networking system 100 updates 230 the plan to include any changed information and communicates 230 the update.

In one embodiment, users of the social networking system may comment on plans. The author of a plan may read comments on the plan, and update the plan to incorporate the suggested comments. Thus, comments provide a mechanism by which users may petition for changes to a plan. Commenting on the contents of a plan may be open to all those users who are able to view the plan, or commenting may be restricted to only those users who are participants in the plan.

Figure 3A:
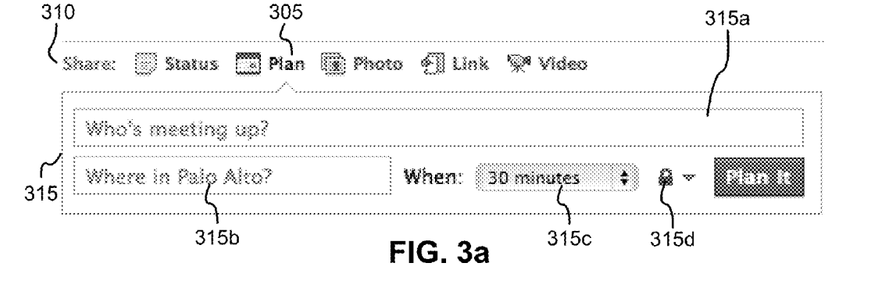
FIG. 3a is a user interface of a social networking system for presenting plan authoring options to a user of the social networking system, according to one embodiment.

FIG. 3a illustrates a user interface of a social networking system for presenting plan authoring options to a user of the social networking system, according to one embodiment. In the example embodiment of FIG. 3a, the option to author a plan 305 is presented as part of a menu 310 of options for interacting with the social networking system 100. When the social networking system 100 receives an indication that a user would like to author a plan, a set of plan authoring options 315 are provided for the user to fill in. In the example embodiment of FIG. 3a, the plan authoring options 315 include adding a list of attendees 315a, specifying a location for the planned activity 315b, specifying a time of occurrence 315c, and specifying a security option 315d.

Figure 3B:
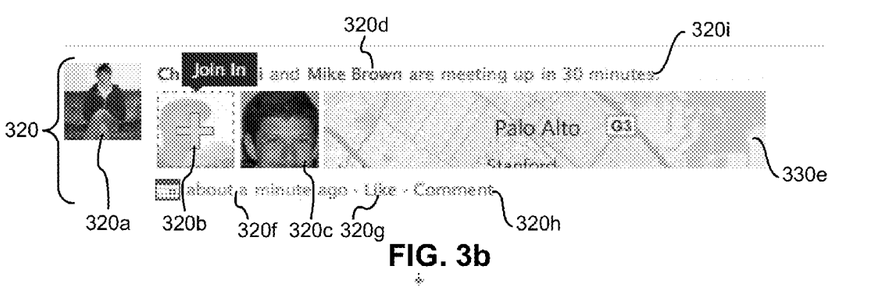
FIG. 3b is a user interface of a social networking system for communicating a plan to users of the social networking system, according to one embodiment.

FIG. 3b illustrates a user interface of a social networking system for communicating a plan to users of the social networking system, according to one embodiment. FIG. 3b illustrates an example of a publication 320 of a plan in a newsfeed to users designated to receive the plan information. In the example embodiment of FIG. 3b, the publication 320 displays a photo 320a of the author of the plan. In another embodiment, the photo 320a may display a different attendee of the plan, depending upon the social graph connection between the user viewing the plan information and the attendees of the plan. For example, if the user viewing the newsfeed publication 320 is connected through the social graph with an attendee who is not the author, the photo 320a may show the user's closest attendee connection through their social graph.

The publication 320 also displays the list of attendees 320d, a time the plan is to take place 320i, and one or more photos 320c of other attendees of the plan. The publication 320 also provides the time 320f when the plan was posted and/or when the plan was last updated. The publication 320 also provides options for the users viewing the publication to "like" 320g or comment 320h on the plan. The publication 320 also provides the user with the option of communicating their interest to be added to the plan 320b.

If a plan author specifies a location for the planned activity, the social networking system 130 may display a map 320e centered on the location indicated in the plan. In the example embodiment of FIG. 3b, the plan author has not specified a location, and so the map is generalized to either not be displayed, or to display the plan authors current location. In some cases, the author may specify a location in the plan, for example, the plan may indicate that two friends are meeting up at "the bar." The social networking system 100 may trace the social graph of the attendees of the plan to determine what real-world location is meant by the location "the bar." The plan then displays the map 320e with the determined real-world location of the plan.

Figure 3C:
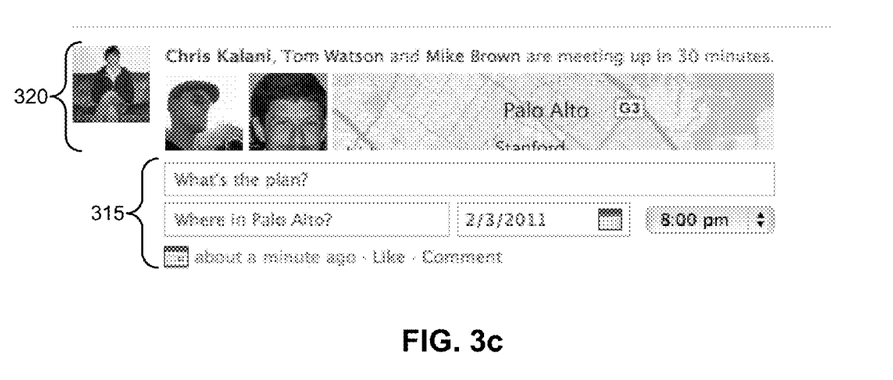
FIG. 3c is a user interface of a social networking system for presenting plan updating options to a user of the social networking system, according to one embodiment.

FIG. 3c illustrates a user interface of a social networking system for presenting plan updating options to a user of the social networking system, according to one embodiment. In the example embodiment of FIG. 3c, a user is presented with published 320 information that is already known about the plan. The plan information is filled into the relevant fields 315 where it is known. For those pieces of information that have not yet been added to the plan, the relevant options are blank and appear as they would to an original plan author.

Figure 4A:
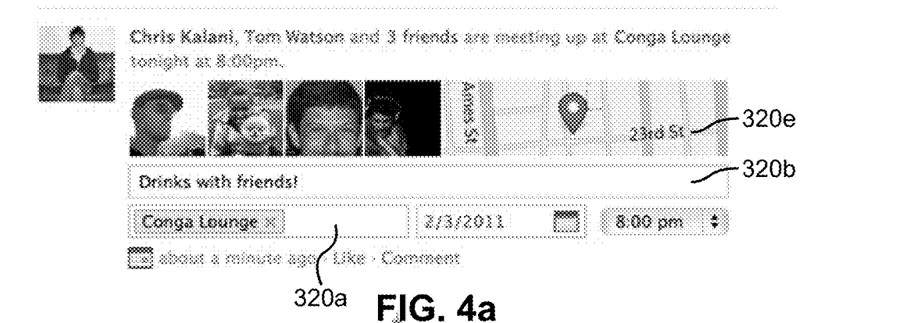
FIG. 4a is a user interface of a social networking system for receiving plan updates from a user of a social networking system, according to one embodiment.

FIG. 4a illustrates a user interface of a social networking system for receiving plan updates from a user of a social networking system, according to one embodiment. In the example embodiment of FIG. 4a, a user has filled in plan information that had not been previously specified, for example, the activity to be undertaken 320b and location that the plan will be occurring 320a. Further, once the location 320a has been specified, the map 320e of where the plan will occur has been adjusted to reflect the determined real-world location of the plan.

Figure 4B:
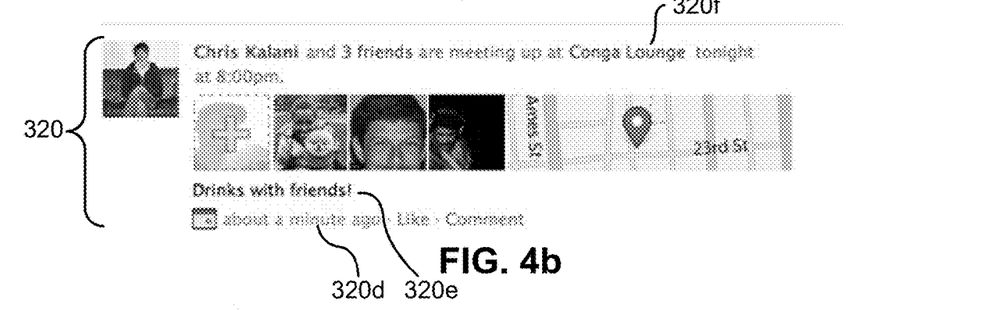
FIG. 4b is a user interface of a social networking system for communicating an updated plan to users of the social networking system, according to one embodiment.

FIG. 4b illustrates a user interface of a social networking system for communicating an updated plan to users of the social networking system, according to one embodiment. The example embodiment of FIG. 4b follows the example of FIG. 4a assuming the user finished the illustrated plan update. Thus, the publication 320 of the plan includes information regarding the location of the plan 320f, and the activity 320e to be undertaken. In the example embodiment of FIG. 4b, the last time the plan was updated 320d was also updated to account for the update.

Figure 4C:
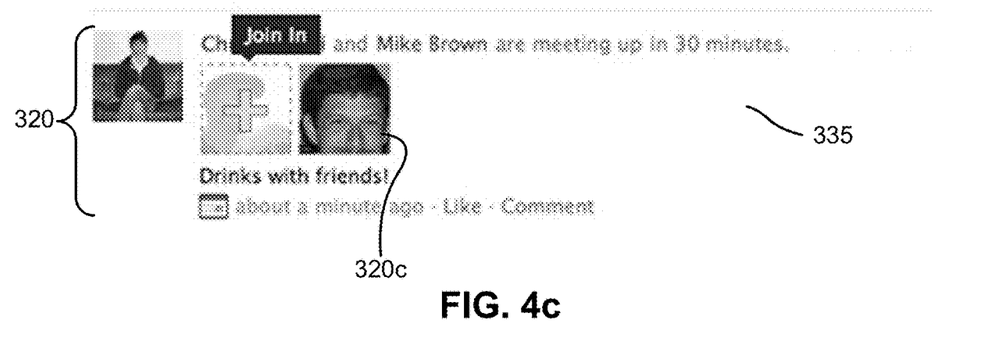
FIG. 4c is a user interface of a social networking system for communicating a plan to users of the social networking system, where the location of the plan has not been specified, according to one embodiment.

FIG. 4c illustrates a user interface of a social networking system for communicating a plan to users of the social networking system, where the location of the plan has not been specified, according to one embodiment. Plans may be created with minimal initial information. In the example embodiment of FIG. 4c, a plan publication 320 does not include a location for the planned activity, and as a result the space where the map 320e was shown in earlier examples is replaced by an empty space 325. In other embodiments, if the location is not specified the small FIGS. 320c representing the attendees of the plan fill the space of the publication including space 325.

Figure 5:
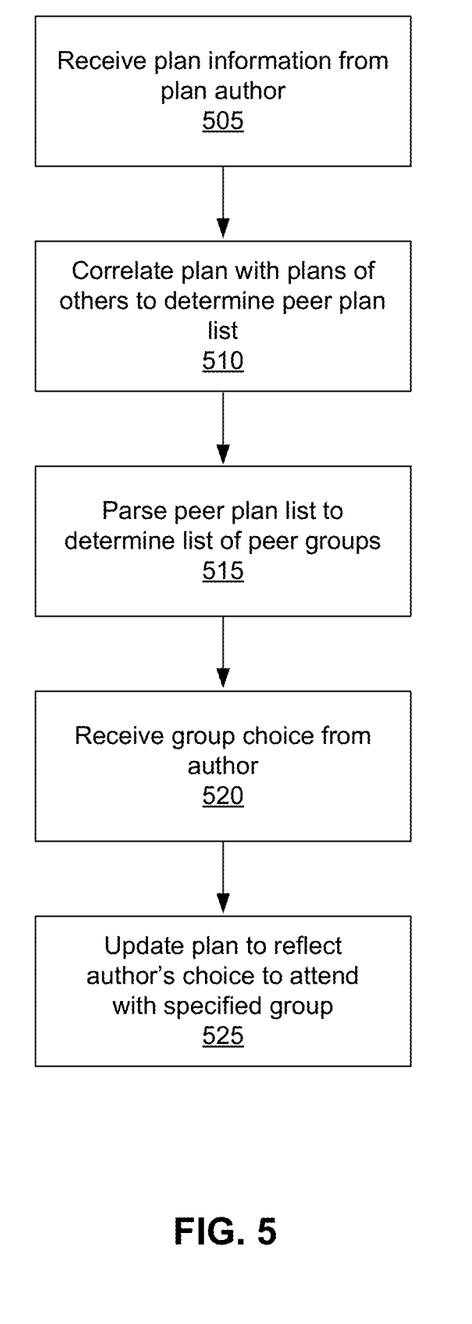
FIG. 5 is a flowchart of one embodiment of a process for coordinating plans for groups of users in a social networking system.

FIG. 5 is a flowchart of one embodiment of a process for coordinating (e.g., connecting or joining) plans for groups of users in a social networking system. In one embodiment, the social networking system uses plans stored in the interaction data 130 of the social graph 115 to connect plans together for disparate users who know each other but did not know that the other had a similar plan in mind for a given future activity. For example, if a user authors a plan indicating that the user will be attending a large concert on a given evening, the user may know that thousands of others may have the same plan. However, it is likely that the user is not interested in attending the concert with those other people. But the user may not know whether another user connected to the user through the social graph 115 is also planning to attend the concert. In fact, there might be several different groups of people connected to the user through their social graph 115 with the same plan to attend the concert.

To coordinate plans for groups of users, the networking system 100 receives 505 plan information from a plan author. The received 505 plan information is used to correlate 510 the plan with plans of other users in the social networking system 100 to determine 510 a peer plan list. The peer plan list consists of those plans with similar plan information to the received 505 plan information. In one embodiment, the peer plan list consists of only those plans by other users with identical plan information to the received 505 plan information. In one embodiment, the peer plan list consists of plans with information that is similar to, but not identical to, the received 505 plan information. The list of peer plans is generated by taking the received 505 peer plan information and traversing the social graph 115 to match details in the plan to plans created by other users who are connected to the plan author through the social graph 115.

The list of peer plans is parsed 515 to pull out the attendees of each plan in the list of peer plans. The attendees of each plan are organized into a peer group, and the list of all peer groups is presented to the author. Presenting the list of peer groups to the author provides the author with a choice of which group of peers to attend the plan with. The social networking system 100 receives 520 the group choice from the plan author. The social networking system 100 then updates the plan to reflect the author's group choice to attend with a specific group from the list of peer groups. In one embodiment, the author's plan is updated to include the attendees from the chosen peer group as attendees of the plan. In one embodiment, the author's plan is merged with the plan correlated with the author's group choice, such that only a single plan exists in the interaction data 115. In this embodiment, the plan will fill in details that may have been specified in one plan but not the other.

In one embodiment, aspects of the plan which are not explicitly defined by the author may be inferred from the details the author has provided. For example, if the author of the plan does not specify the future activity to be performed when the plan is carried out, the future activity may be inferred from the other information entered by the user. This information may be obtained by using the information provided as part of the plan to search the social graph 115 to find those objects in the object data 120 that have a high likelihood of being associated with the user's plan.

For example, if the author indicates a plan to be at the San Diego Sports Arena off Sports Arena Blvd in San Diego on April $1^{st}$ at 8:00 pm, the social networking system 100 may look at the object data 120 for the San Diego Sports Arena and determine that a Cirque Du Soleil show is scheduled for that time and place. The social networking system 100 may then infer that the author will be attending the show and will add the information to the plan.

In another example, the social networking system 100 may correlate information from various plans to fill in holes in plans made separately by different authors. For example, a first author may indicate they are going to meet up with User A, User B, and User C at 8 p.m. on Friday. A second author may indicate they are going to meet up with User A and User B at 8 pm on Friday at a movie theatre. The social networking system may trace the social graph 115 to infer that the plan is a meet up between Users A, B and C at 8 p.m. on Friday at 8 p.m. at the movie theatre. In this example, information regarding the location of the movie theatre would be added to the plan of the first author, and information regarding the presence of User C would be added to the plan of the second author.

The social networking system 100 may use inference to fill in the holes with respect to the list of participants, the activity to be undertaken, the activity to be engaged in, the time of the activity, or other details specified by the author. In one embodiment, the inferred information for the plan is automatically added to the plan. In another embodiment, the social networking system provides a confirmation to the plan's author authorizing the addition to the plan. Confirmation may be preferable in instances where social graph 115 connections are relatively weak between the details of a plan as specified by an author, and the potential additions to the plan as determined by the social networking system 100.

Figure 6:
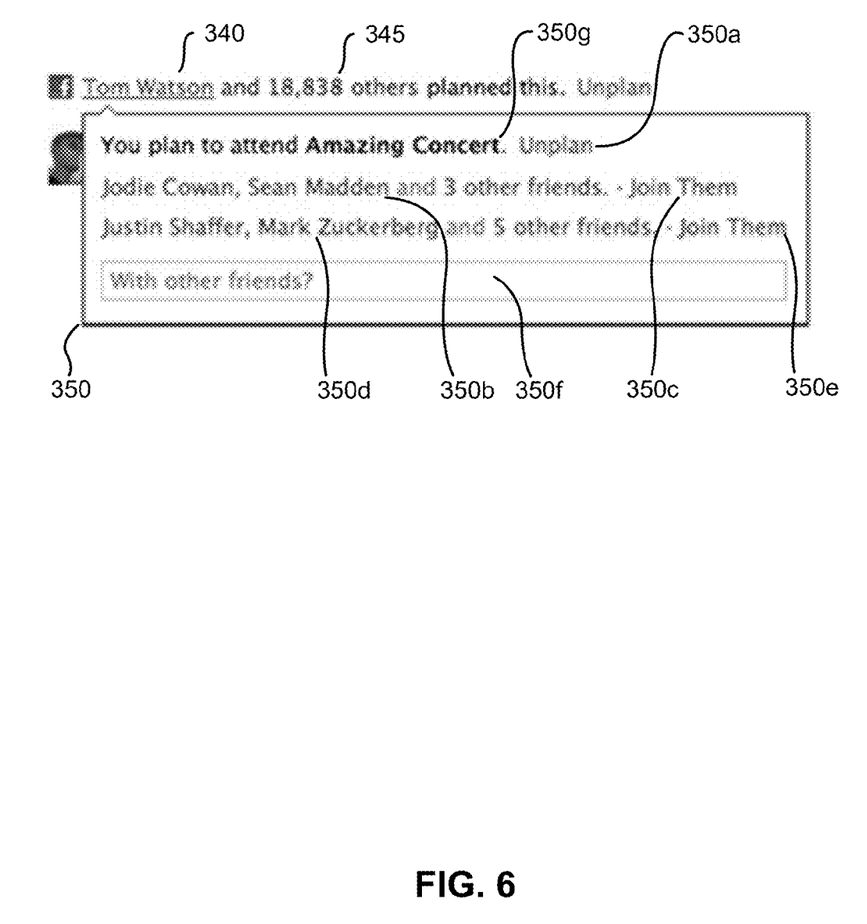
FIG. 6 is a user interface of a social networking system for receiving options to an author of a plan for groups of users of the social networking system to attend the plan with, according to one embodiment.

FIG. 6 illustrates a user interface of a social networking system for communicating options to an author of a plan for groups of users of the social networking system to attend the plan with, according to one embodiment. In the example embodiment of FIG. 6, the author of the plan is presented 340 optionally along with a count of a number of users of the social networking system who have planned a similar 345 future activity.

The author is presented with a series of options 350 for choosing a group with which to attend the plan. The options 350 include the ability to unplan 350*a* the planned future activity and a brief summary of the planned activity 350*g*. The options 350 also include a list of peer groups 350*b* and 350*d*, as well as the option to join each of the peer groups 350*c* and 350*e*. The options 350 also include the option for the author of the plan to suggest another group of users or attendees to add to their plan 350*f*.

The unplan 350*a* option allows the author of the plan to delete (or remove) a plan from the social networking system. In one embodiment, if the author unplans 350*a* a plan, the plan is removed for all attendees of the plan as well. In another embodiment, if the author unplans 350*a* a plan, the author is removed from being an attendee of the plan, and another attendee of the plan is elected to be the author of the plan.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online system from a client device through a network, a plan being authored by an authoring user, the plan describing a planned activity of the authoring user, the plan comprising at least one plan attendee including the authoring user, each plan attendee of the authoring user's plan represented by a node in a social graph of a first set of nodes;
storing, in the online system, the authorizing user's plan as a first set of edges in the social network graph connecting the nodes of the first set of nodes;
accessing, by the online system, one or more peer plans created by other users of the online system different from the authoring user, each peer plan describing a planned activity and comprising at least one attendee;
correlating, by the online system, the plan with the peer plans to determine at least one matching peer plan;
determining, by the online system, a list of matching peer groups, each peer group comprising the attendees of one of the matching peer plans;
providing, by the online system to the client device through the network, the authoring user with the list of peer groups and an option to join the authoring user's plan to one of the matching peer plans;
receiving, at the online system from the client device through the network, a choice from the authoring user to join the authorizing user's plan to a selected one of the matching peer plans, wherein each attendee of the selected peer plan is represented by a node in the social graph of a second set of nodes, and wherein the selected peer plan is stored in the online system as a second set of edges in the social network graph connecting the nodes of the second set of nodes; and
updating, by the online system, the selected peer plan to include the plan attendees of the authoring user's plan by forming edges in the social graph connecting the first set of nodes and the second set of nodes.

2. The method of claim 1, wherein accessing the at least one peer plan comprises:
searching a set of users with whom the authoring user has established connections in the online system for the peer plans authored by users of the online system connected to the authoring user, where the peer plans share at least one detail in common with the plan.

3. The method of claim 2, wherein the at least one shared detail comprises one of: a time, a group of attendees, a location, or an activity.

4. The method of claim 1, further comprising:
communicating the plan to a user group comprising a set of users with whom the authoring user or the attendees of the selected peer plan have established connections in the online system.

5. The method of claim 4, wherein communicating the plan to the user group comprises publishing the plan to a newsfeed of each user in the user group.

6. The method of claim 4, wherein communicating the plan to the user group comprises pushing a notification of the plan to each user in the user group.

7. The method of claim 4, further comprising: receiving a privacy setting selected by the author, wherein the user group is determined based on the security setting.

8. The method of claim 1, wherein updating the selected peer plan further comprises:
comparing the plan to the selected peer plan; and
adding at least one detail to the selected peer plan, the added detail including information from the authoring user's plan, wherein the added detail is at least one of: a time, a group of attendees, a location, or an activity.

9. The method of claim 1, further comprising:
receiving a plan update, the plan update comprising at least one of: a time, a group of attendees, a location, or an activity; and
responsive to receiving the plan update, communicating the plan update to a user group.

10. The method of claim 9, wherein the plan update is received from at least one of the authoring user and an attendee of the selected peer plan.

11. A computer program product comprising a non-transitory computer-readable storage medium including instructions that, when executed by a processor, cause the processor to:
receive, at an online system from a client device through a network, a plan being authored by an authoring user, the plan describing a planned activity of the authoring user, the plan comprising at least one plan attendee including the authoring user, each plan attendee of the authoring user's plan represented by a node in a social graph of a first set of nodes;
store, in the online system, the authorizing user's plan as a first set of edges in the social network graph connecting the nodes of the first set of nodes;
access, by the online system, one or more peer plans created by other users of the online system different from the authoring user, each peer plan describing a planned activity and comprising at least one attendee;
correlate, by the online system, the plan with the peer plans to determine at least one matching peer plan;
determine, by the online system, a list of matching peer groups, each peer group comprising the attendees of one of the matching peer plans;
provide, by the online system to the client device through the network, the authoring user with the list of peer groups and an option to join the authoring user's plan to one of the matching peer plans;
receive, at the online system from the client device through the network, a choice from the authoring user to join the authoring user's plan to a selected one of the matching peer plans, wherein each attendee of the selected peer plan is represented by a node in the social graph of a second set of nodes, and wherein the selected peer plan is stored in the online system as a second set of edges in the social network graph connecting the nodes of the second set of nodes; and
update, by the online system, the selected peer plan to include the plan attendees of the authoring user's plan by forming edges in the social graph connecting the first set of nodes and the second set of nodes.

12. The computer program product of claim 11, wherein to access the at least one peer plan, the instructions cause the processor to:
    search a set of users with whom the authoring user has established connections in the online system for the peer plans authored by users of the online system connected to the authoring user, where the peer plans share at least one detail in common with the plan.

13. The computer program product of claim 12, wherein the at least one shared detail comprises one of: a time, a group of attendees, a location, or an activity.

14. The computer program product of claim 11, further comprising instructions causing the processor to:
    communicate the plan to a user group comprising a set of users with whom the authoring user or the attendees of the selected peer plan have established connections in the online system.

15. The computer program product of claim 14, wherein communicating the plan to the user group comprises publishing the plan to a newsfeed of each user in the user group.

16. The computer program product of claim 14, wherein communicating the plan to the user group comprises pushing a notification of the plan to each user in the user group.

17. The computer program product of claim 14, further comprising instructions causing the processor to:
    receive a privacy setting selected by the author, wherein the user group is determined based on the security setting.

18. The computer program product of claim 11, wherein to update the selected peer plan, the instructions cause the processor to:
    compare the plan to the selected peer plan; and
    add at least one detail to the selected peer plan, the added detail including information from the authoring user's plan, wherein the added detail is at least one of: a time, a group of attendees, a location, or an activity.

19. The computer program product of claim 11, further comprising instructions causing the processor to:
    receive a plan update, the plan update comprising at least one of: a time, a group of attendees, a location, or an activity; and
    responsive to receiving the plan update, communicate the plan update to a user group.

20. The computer program product of claim 19, wherein the plan update is received from at least one of the authoring user and an attendee of the selected peer plan.

* * * * *